Sept. 4, 1956 S. HILLER, JR., ET AL 2,761,635
ROTARY WING AIRCRAFT SYSTEM
Filed June 25, 1951 6 Sheets-Sheet 1

INVENTORS
STANLEY HILLER, JR.
HAROLD H. SIGLER
BY
ATTORNEY

Sept. 4, 1956 S. HILLER, JR., ET AL 2,761,635
ROTARY WING AIRCRAFT SYSTEM
Filed June 25, 1951 6 Sheets-Sheet 6

INVENTORS
STANLEY HILLER, JR.
HAROLD H. SIGLER
BY

ATTORNEY

United States Patent Office 2,761,635
Patented Sept. 4, 1956

2,761,635

ROTARY WING AIRCRAFT SYSTEM

Stanley Hiller, Jr., Atherton, and Harold H. Sigler, San Carlos, Calif., assignors to Hiller Helicopters, Palo Alto, Calif., a corporation of California Application June 25, 1951, Serial No. 233,418

12 Claims. (Cl. 244—17.19)

This invention relates to rotary wing aircraft, and more particularly to a jet propelled helicopter wherein jet motors are provided to drive the rotor wings about the axis of a rotor column.

Summarizing this invention, it has as its objects, among others, the provision of an improved simple and yet efficacious fuel distributing system for feeding fuel to jet motors mounted on the outboard ends or tips of the helicopter rotor wings; the provision of an improved resilient mounting for the rotor column, which although particularly adapted for a relatively light weight jet propelled ship, may be employed in rotary wing aircrafts of other types; and the provision of improved simple pilot operable control mechanism for effecting controls of various mechanisms on the ship and which may be quickly and easily bodily adjusted to various positions on the operator's or pilot's station of the ship.

The rotor wings of the ship are controlled by a rotor control system of the type disclosed in assignee's Patent No. 2,481,750, dated September 13, 1949, wherein a pilot operable control blade is provided to control the cyclic pitch and ultimate flapping of a lift wing. A "feed-back" leverage is also provided to impart pitch adjustment of a control blade resulting from flapping or end to end tilting of the lift wing to accomplish the results explained in assignee's Patent No. 2,534,353, dated December 19, 1950. In the embodiment of the ship illustrated herein, the particular rotor head construction is the same as that disclosed and claimed in assignee's patent to Stanley Hiller, Jr., and Harold H. Sigler for "Rotor Head for Rotary Wing Aircraft," Patent No. 2,631,679, dated March 17, 1953, and is consequently described herein only generally.

A hollow rotor column or shaft upon which the wings of the rotor are universally mounted, is formed with an interior passage for conducting fuel to the jet motors; and collective pitch control shafting for such wings extends through and is movable axially along the column. The fuel feeding means for conducting fuel to the jet motors from the rotor column includes a fuel distributing member mounted over the top end of the rotor column on the top of the axially movable collective pitch control shafting; and balanced flexible fuel lines are provided between the hollow rotor column and the fuel distributing member, and between the fuel distributing member and the jet motors on the wings.

To minimize transmission of vibrations to the body of the ship and also to the above related fuel lines, a resilient mounting is provided for the rotor column on a support element for the column, which is fixed to the body of the ship. Such resilient mounting has been found most advantageous in the form of a unit comprising a rubber sleeve bonded to inner and outer metal sleeves, and which is located about the column between the column and the support thereof.

An improved pilot operable control arrangement is provided on the ship, which is bodily adjustable to various of selectable positions at the pilot's station, so that it can be readily manipulated by either left hand or right hand control with the pilot sitting in any position on the pilot's seat of the ship that he may prefer. Such control comprises a master lever which is mounted on the body of the ship for back and forth pivotal movement in an upright direction to control collective pitch adjustment of the rotor wings, and which is also mounted for back and forth pivotal movement in a lateral direction to control a tail rudder for steering the body of the ship. This control lever is slidably mounted for bodily lateral adjustment along a horizontally positioned transversely extending shaft, to provide for the bodily adjustment of the control lever; and suitable means is provided to latch releasably the control lever to the shaft at a predetermined adjusted position.

An independently manually operable fuel control handle is mounted on the master control lever so that the pilot may conveniently control the supply of fuel to the jet motors. In this connection, the outer ends or heads of the master control lever, and the independently operable fuel control handle are in alignment and closely positioned adjacent each other to enable the pilot to effect the three described controls with one hand.

Referring to the drawings.

The helicopter comprises a body 1 of any suitable light weight construction, to the tail of which is pivotally mounted for pivotal movement about an upright axis, a steering rudder 1'. A pair of diametrically opposite lift wings 2, each having a ram jet motor 2' of any suitable construction mounted on its outboard or tip end, is universally mounted on the top of a rotor column by the rotor head structure disclosed in the aforementioned copending application. Control blades or paddles 3 are also mounted for universal movement of the top of the rotor column together with the wings 2; the control blades and the wings functioning in the manner disclosed in the aforementioned patents and copending application.

Figure 4:
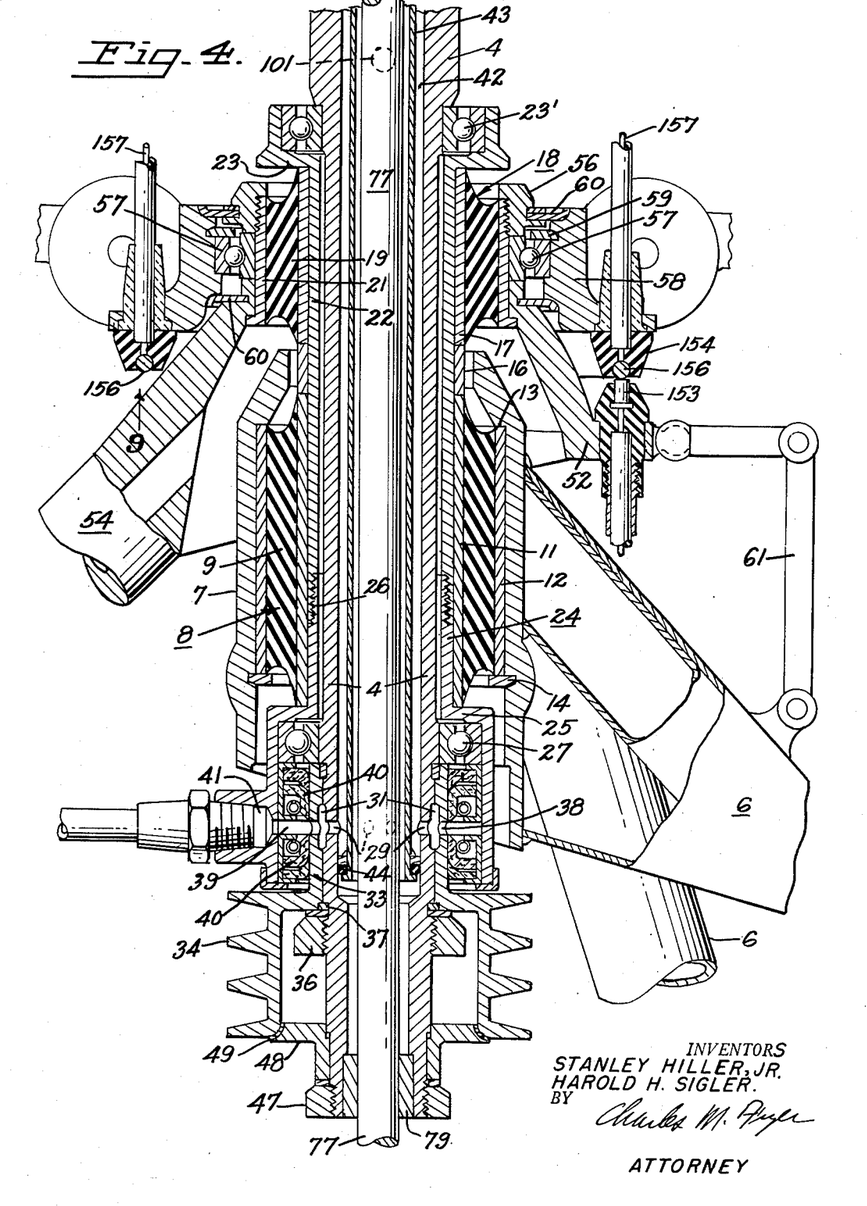
Fig. 4 is an enlarged fragmentary vertical section, partly in elevation, of a form of mounting and pilot operable control mechanism for the rotor head, illustrating the fuel feed through the rotor column; portions of the structure being omitted for clarity.
Figure 5:
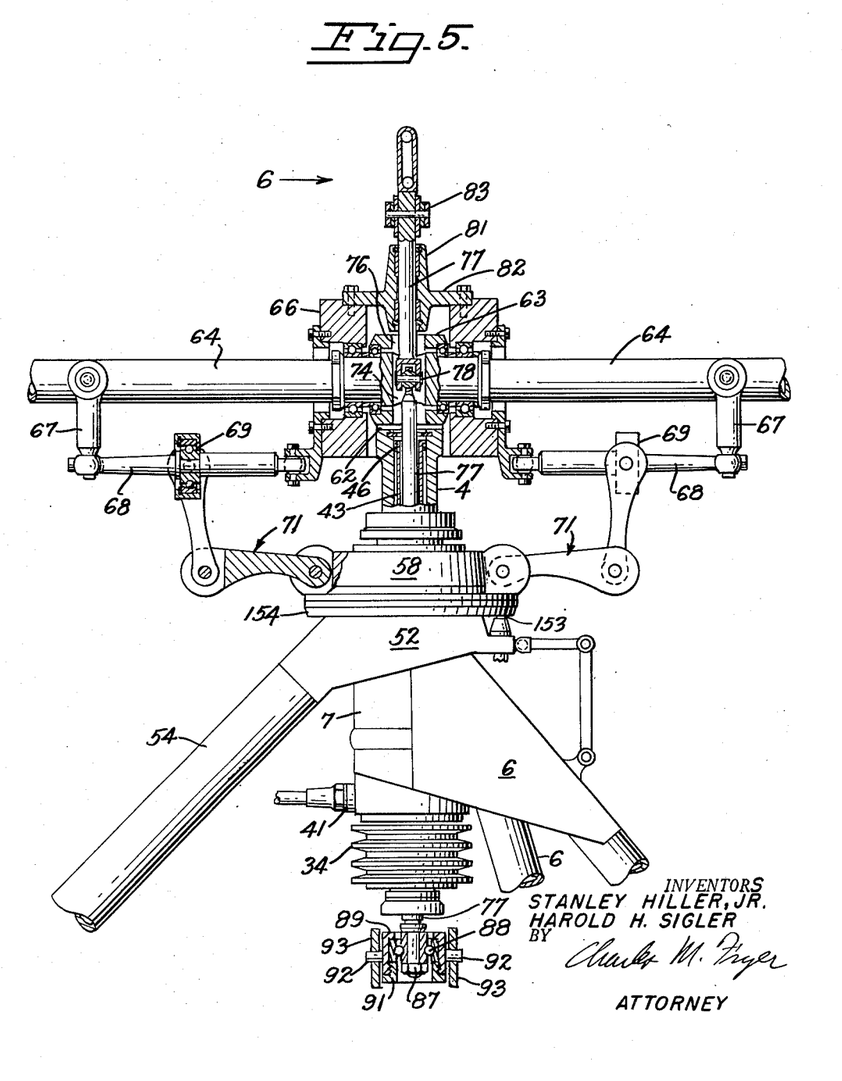
Fig. 5 is a vertical sectional view, partly in elevation, of the rotor column and head; portions of the structure being omitted for clarity.
Figure 6:
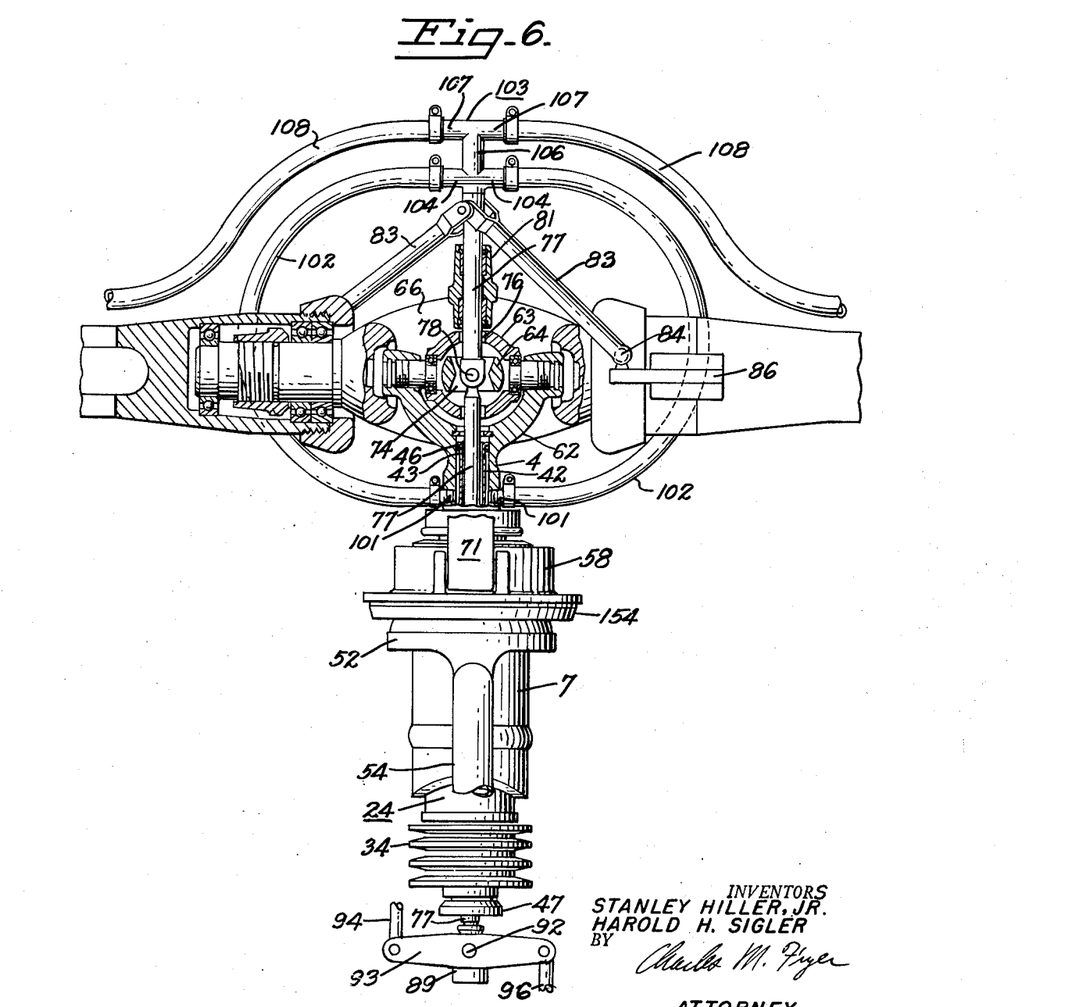
Fig. 6 is an elevational view, partly in section, of the structure shown in Figure 5, looking in the direction of arrow 6 in Fig. 5; portions of the structure being omitted from the view for clarity.
Figure 7:
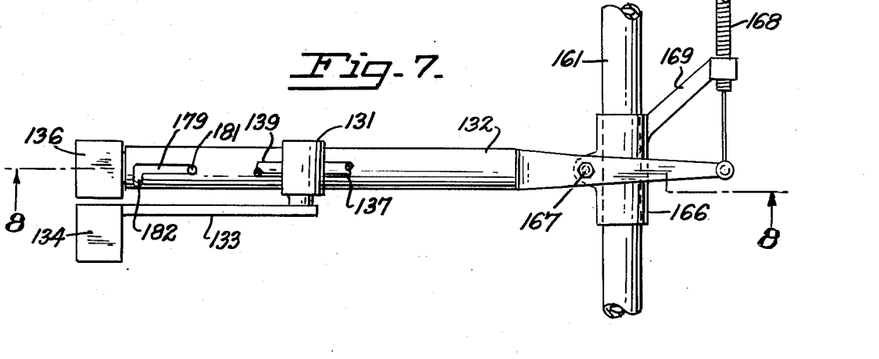
Fig. 7 is a fragmentary plan view of the master pilot operable control lever and its mounting, illustrated in Fig. 3.
Figure 8:
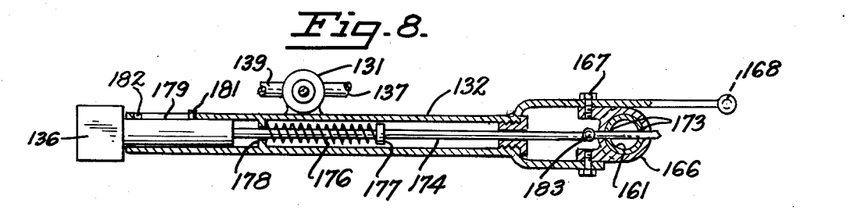
Fig. 8 is a sectional elevation taken in planes indicated by line 8—8 in Fig. 7.
Figure 9:
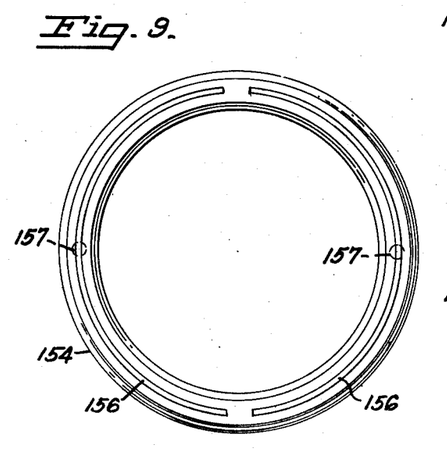
Fig. 9 is a bottom plan view of the ignition distributor ring, looking in the direction of arrow 9 in Fig. 4.
Figure 10:
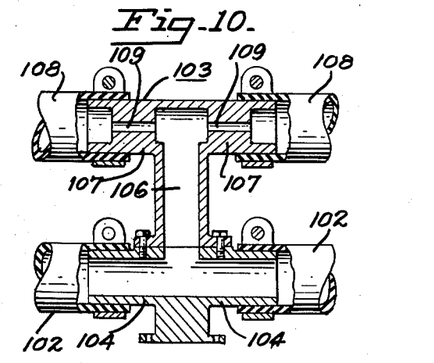
Fig. 10 is a vertical sectional view of the fuel distributing member which is adapted for mounting over the rotor column.

The rotor column comprises a hollow shaft 4 which is rotatable about its axis, and is mounted on the body of the ship by means including struts 6 which are secured to the body of the ship. To the upper ends of struts 6 is welded or secured by any other suitable means a bracket sleeve 7. Shaft 4 extends through sleeve 7; and a floating or resilient isolation mount is provided in sleeve 7 for the rotor shaft and associated structure, comprising a so-called "Lord" tube form bonded rubber shear type mounting 8. Such mounting is formed of a sleeve 9 of flexible resilient material, such as rubber, about rotor shaft 4 and which is bonded to an inner metal sleeve 11 and to an outer metal sleeve 12. Outer sleeve 12, and consequently the entire mounting 8, is fixedly clamped against a shoulder 13 of bracket sleeve 7 by means of a split clamping ring 14. It will be noted with reference to Fig. 4 that annular clearance is provided at each end of the sleeve 7 about the rotor column so that the rotor column can rock freely and without interference on its resilient mounting.

Abutting the top of sleeve 11 is a spacer ring 16 which abuts an inner metal sleeve 17 of a flexible resilient mounting 18 of wobble or cyclic pitch control mechanism for the lift wings. Mounting 18 is disclosed and claimed in assignee's copending application by Stanely Hiller, Jr., Serial No. 202,770, filed December 26, 1950, for "Cyclic Pitch Control Mounting for Rotary Wing Aircraft" and is of the same type as mounting 8, including a rubber sleeve 19 bonded both to inner metal sleeve 17 and to an outer metal sleeve 21. A stationary sleeve 22 is positioned about rotor shaft 4 and is provided with an upper shoulder 23 against which the resilient wobble mechanism mounting 18 is clamped; a bearing 23' being provided on shoulder 23 for rotor shaft 4.

Stationary sleeve 22 extends into bracket sleeve 7; and all the previously described assembly is held in position on bracket sleeve 7, by means of nut member 24 having a shoulder 25 abutting the lower end of sleeve 11, and a screw threaded sleeve portion 26 detachably screwed into the lower end of stationary sleeve 22. Since nut member 24 is detachably secured to sleeve 22 the described parts may be readily assembled.

At its lower end, rotor shaft 4 is piloted in a bearing 27 adjacent shoulder 25 of nut member 24. Fuel inlet ports 29 are provided about the periphery and adjacent the lower end of shaft 4, which communicate with an annular pasage 31 formed by cooperating grooves in the outside of shaft 4 and in the inside of a sleeve 33 which is integral with a fuel pump driving pulley 34; the sleeve being secured for rotation with shaft 4, and being thrust against the inner race of bearing 27 by means of a nut 36 bearing against sealing gasket 37. Sleeve 33 is provided with peripheral fuel inlet ports 38 communicating with the respective fuel inlet ports 29 of shaft 4.

Ports 38 communicate with an annular fuel supply passage 39 provided in nut member 24 between conventional liquid sealing ring structures 40 fixedly mounted in nut member 24 to prevent seepage of the fuel as is passes from a fuel inlet connection 41 on nut member 24 to fuel supply passage 39. The fuel passes upwardly inside of rotor shaft 4 through an annular passage 42 formed by means of a metal tube 43 which is provided at its lower end with an O-ring seal structure 44 which also serves to hold tube 43 for fixed rotation with the rotor shaft.

The upper end of tube 43 is similarly fixed and sealed by O-ring seal structure 46. Pulley and sleeve assembly 33—34 is also secured in position for rotation with rotor shaft 4 by means of a clamping nut 47 screwed to the lower end of rotor shaft 4 and engaging a collar 48 which bears against the lower end of pulley 34; a centering ring 49 being provided between collar 48 and the pulley. Fuel flowing upwardly in passage 42 is conducted to the jet motors 2' in a manner to be subsequently described.

Pilot operable means connected to mounting 18 of the wobble mechanism, is provided for effecting cyclic pitch control of the control blades 3; and the type of such mounting disclosed and described in detail in assignee's aforementioned Hiller and Sigler copending application, is disclosed herein for purposes of illustration. A ring member 52 is fixed to the outer sleeve 21 of mount 18, to which is attached an overhead pilot operable control stick 54. Ring 52 is clamped in position by a nut 56 which also clamps the inner race of a roller bearing 57 against ring 52. The outer race of bearing 57 is seated on rotatable pitch control or wobble ring 58, and held in position by a snap ring 59; suitable seals 60 being provided over bearing 57. Anchoring linkage 61 is connected to ring 52 to confine movement of wobble mechanism to tilting movement only. By manipulation of control stick 54, the plane of inclination of the outer wobble ring can be adjusted at the will of the operator.

As previously related, lift wings 2 and control blades 3 are universally mounted on the upper end of rotor column 4 to provide the type of control described in the aforementioned patents. As is described in detail in the aforementioned Hiller and Sigler copending application, the particular mounting disclosed herein for purposes of illustration, comprises a fork 62 at the top end of rotor column 4 on which is journalled a cross shaped universal mount member or spider element 63. A single shaft 64, on the ends of which are mounted the control blades 3, is journalled in spider 63 on an axis transverse to the pivotal axis of the spider on the fork; and on this shaft is journalled a hub member 66 upon which lift wings 2 are independently journalled for collective pitch adjustment. Feed back mechanism is also provided, comprising an arm 67 pivotally connected to shaft 64 at a point between each control blade and a side of hub 66, and a feed back lever 68 universally connected to each arm 67 and to a side of the hub. Each of feed back levers 68 is anchored by a universal connection 69 to a reversing scissors linkage 71 in turn pivotally connected to rotatable ring 58 of the wobble mechanism.

Control blade shaft 64 is provided with a central aperture 74 matching with a central aperture 76 in spider 63; and axially shiftable shafting 77 extends through and is movable along the axis of rotor shaft 4 to provide part of the mechanism for imparting collective pitch adjustment to the rotor wings 2. Shafting 77 includes two sections having a universal connection 78 at the center of the universal mounting for the rotor head; the previously mentioned apertures 74 and 76 permitting passage of shafting 77 therethrough.

At its lower end, collective pitch control shafting 77 is piloted in a bearing 79 in the lower end of the rotor column 4. The upper portion of shafting 77 is slidably mounted in a sleeve 81 formed on a bracket 82 fixedly secured to hub member 66. At its upper end, shafting 77 is pivotally connected to a pair of push rods 83; the lower end of each rod 83 being universally connected by a ball joint 84 to a bracket plate 86 secured to each lift wing 2. The connections of push rods 83 are at opposite sides of the respective lift wings so that when shafting 77 is moved axially, the lift wings will be simultaneously adjusted equally in opposite directions about their journal supports on hub 66, and independently of any adjustments effected by the pilot controlled wobble mechanism.

Pivotally connected at 92 to opposite sides of the cap structure 89 are a pair of lever arms 93 which at one end are pivotally connected to an upstanding link 94 in turn pivotally connected to bracket sleeve 7. At the opposite end, lever arms 93 are pivotally connected to axially movable push link 96 conected to control mechanism to be described, to thus provide for axial reciprocation of collective pitch actuating shafting 77.

As previously related, fuel is supplied to inlet connection 41, and flows upwardly through passage 42 in the rotor column. Adjacent the rotor head, the rotor column is provided with diametrically opposite outlet ports 101 from each of which the fuel is conducted to the respective jet motors 2' on the lift wings, by means including a flexible fuel tube or line 102 of any suitable material, such as rubber, connected in turn to a fuel distributing member 103 mounted on and movable with control shaft 77. A pair of fuel lines 102 is preferably connected to fuel distributing member 103, one for each ram jet motor 2' as this provides a balanced arrangement. However, functionally, one fuel line 102 would suffice.

Fuel distributing member 103 has a pair of lower opposite sleeve portions 104 providing inlet ports to each of which a fuel line 102 is connected. Sleeve portions 104 communicate with a central passage 106 which in turn communicates with upper diametrically opposite sleeve portions 107 providing outlet ports to each of which is connected a flexible fuel tube or line 108 of the same type as flexible lines 102, for conducting the fuel to a jet motor 2'. Sleeve portions 107 are each formed with restricted throttling passages 109 to effect equal distribution of fuel to the respective jet motors 2'. At the end opposite that connected to fuel distributing member 103, each fuel line 108 is secured to a metal fuel line or tube 111 fixedly mounted inside of and extending through a lift wing 2; the outer end of such fuel line 111 being connected to a jet motor 2'.

From the preceding, it is seen that the location of fuel distributing member 103 on axially movable collective pitch control shafting 77, and the associated flexible fuel lines connected therewith, provide a compact and simple arrangement for the feeding of fuel flowing through the rotor column to the respective jet motors on the lift wings. In this connection, the flexible fuel lines permit movement of the fuel distributing member 103 with the collective pitch control shafting 77; and the resilient isolation mount for the rotor shaft reduces vibration to a minimum.

The manner of feeding the fuel to the rotor column will now be described. A fuel tank 112 is provided on the body of the ship under the pilot's seat 113. Such fuel tank is connected to metal outlet tubing 114 in turn connected to a suitable fuel strainer 116. From strainer 116, the fuel is conducted by metal tubing 116' to a conventional fuel flow meter 117; a check valve 118 being interposed between the strainer and the fuel flow meter to prevent back flow of fuel into the tank and to keep the system primed. A by-pass connection 119 is provided about check valve 118; and a conventional manually operable double acting aircraft pump 121 is provided in by-pass 119 for operation during starting to prime the system.

From fuel flow meter 117, the fuel is conducted by metal tubing 122 to the inlet port of a fuel pump 123 mounted on a bracket 124 secured to a strut 6; and the discharge port of the pump is connected to metal discharge tubing 126; a conventional by-pass line 127 containing a pressure relief valve 128 being connected to lines 122 and 126 between the inlet and the discharge ports of the pump. Pump 123 is driven from the previously mentioned drive pulley 34 by belting 129.

A pilot operable fuel throttle valve 131 is provided to control the quantity of fuel supply, as determined by the pilot. Valve 131 is mounted on a pilot manipulatable master control lever 132 at the pilot's station for ready manipulation by the pilot. The mounting of lever 132 and the controls effected thereby will be described hereinafter. Connected to fuel valve 131 is a pilot operable control lever or handle 133 which upon manipulation thereof operates valve 131 to control the flow of fuel. It will be noted that the head 134 of control handdle 133 is in line with and closely adjacent the head 136 of control lever 132. Thus, the pilot can readily manipulate both of these levers with one hand.

The inlet port of valve 131 is connected to metal tubing 137 fixedly secured to control lever 132 by any suitable means; such tubing 137 being in turn connected to discharge tubing 126 from pump 121 by flexible tubing 138, preferably of rubber. The discharge port of valve 131 is also connected to metal tubing 139 fixedly secured to control lever 132 in the same manner as tubing 137; tubing 139 being connected to flexible tubing 141 of the same type as tubing 138, in turn connected to metal tubing 142 which is connected to the previously mentioned fuel inlet connection 41 to the rotor column. Flexible tube sections 138 and 141 permit various movements of control lever 132.

Preferably, to provide an automatic control for the purpose of preventing runway overspeed of the rotation of the rotor, a valve 143 is provided in tubing 142 ahead of inlet connection 41. This valve is governor controlled by any suitable governor mechanism 144 driven from the rotor column by drive belting 145.

Ignition means is provided for the jet motors 2' to initiate starting thereof in a conventional manner. A conventional battery 146 is connected by wires 147 to a conventional spark coil 148 which is grounded to the ship and is also connected by wire 149 to an ignition control switch 151 mounted for ready accessibility to the pilot on cyclic pitch control stick 54. Switch 151 is in turn connected by a wire 152 to an insulated contact 153 fixedly mounted on fixed ring member 52 of the wobble control mechanism.

A collector ring 154 of suitable insulation is fixedly mounted on the underside of rotatable wobble ring 58. In such ring are imbedded a pair of collector wires 156, each of which engages contact 153 during substantially one half the revolution of the wobble ring as it rotates. The respective collector wires 156 are connected to respective wires 157, each of which extends through a lift wing and is connected to suitable spark ignition means of a jet motor 2'. Thus, for starting the jet motors, the pilot closes ignition switch 151; and after the motors have commenced to fire, the ignition circuit may be shut off.

Pilot operable control lever 132 is mounted on the body of the ship for back and forth movement in a vertical direction to control the collective pitch adjusting mechanism for the lift wings; and it is also mounted for back and forth pivotal movement in a generally horizontal direction to control the position of the body of the ship by steering rudder 1'. Also, the control lever is mounted for transverse bodily adjustment so that it may be positioned between the side ends of the operator's seat or at either side end thereof to suit the convenience of the pilot. Such mounting is in the form of a universal connection which comprises shaft 161, preferably a light tube, extending transversely with respect to the body of the ship, and journalled in spaced brackets 162 for turning movement about a generally horizontal axis.

One end of shaft 161 has fixedly secured thereto a lever arm 163 which in turn is universally connected at 164 to the previously mentioned push link 96 of the collective pitch control actuating mechanism. Slidably mounted for axial adjustment on shaft 161 and adapted to be fixedly secured thereto in a predetermined laterally adjusted position is a sleeve 166. The inner end of control lever 132 is forked, and is pivotally connected to the sleeve at 167 for pivotal movement about an upright axis. Beyond such pivotal connection 167, lever 132 is connected to a conventional Bowden-cable 168, the sleeve of which is supported at the lever end on bracket 169 fixed to sleeve 166. At its opposite end, the sleeve of cable 168 is fixed in a bracket 171 on the tail of the ship; and the push pull wire of cable 168 is connected to a lever arm 172 fixed to steering rudder 1'.

When sleeve 166 is fixed to shaft 161, collective pitch adjustment of the lift wings can be readily effected by the pilot by moving control lever 132 up or down, as desired. In any vertical position of control lever 132, it can be swung laterally in either direction about upright pivotal connection 167 to control steering rudder 1'. Also, in any lateral position of the control lever, it can be moved up or down to effect collective pitch control. Thus, the control of either of these mechanisms can be quickly and readily accomplished by the convenient mounting of control lever 132. At the same time, since fuel control handle 133 is mounted on control lever 132, the fuel control can be readily effected.

Figure 1:
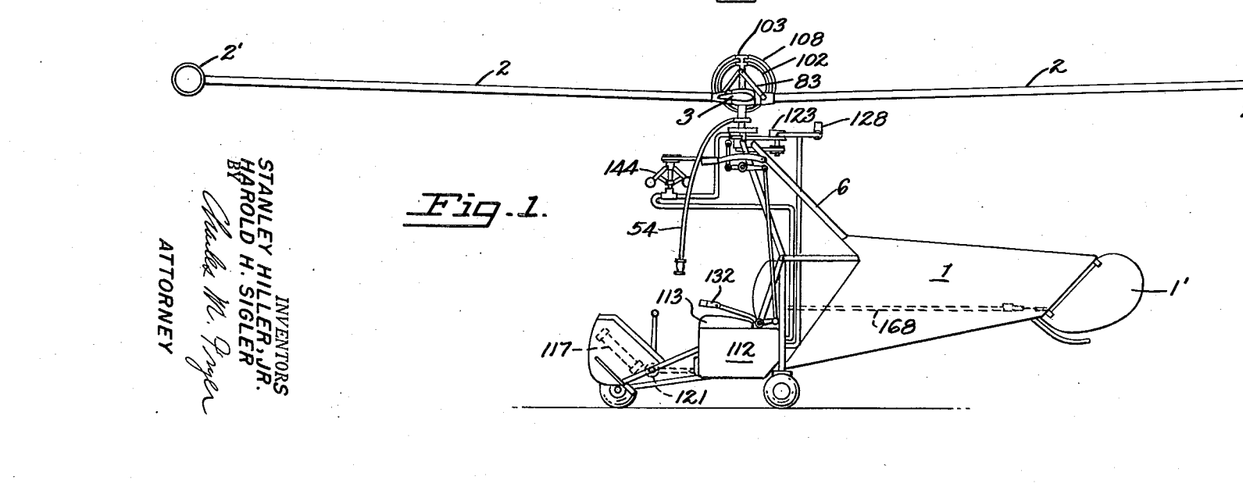
Fig. 1 is a more or less schematic side elevational view of the helicopter; portions of the mechanism being omitted from the view for purposes of clarity.
Figure 2:
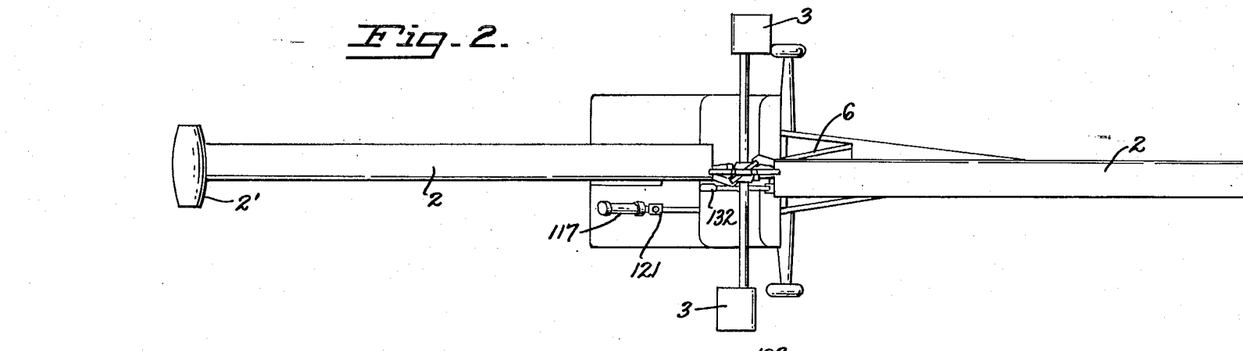
Fig. 2 is a top plan view of Fig. 1.
Figure 3:
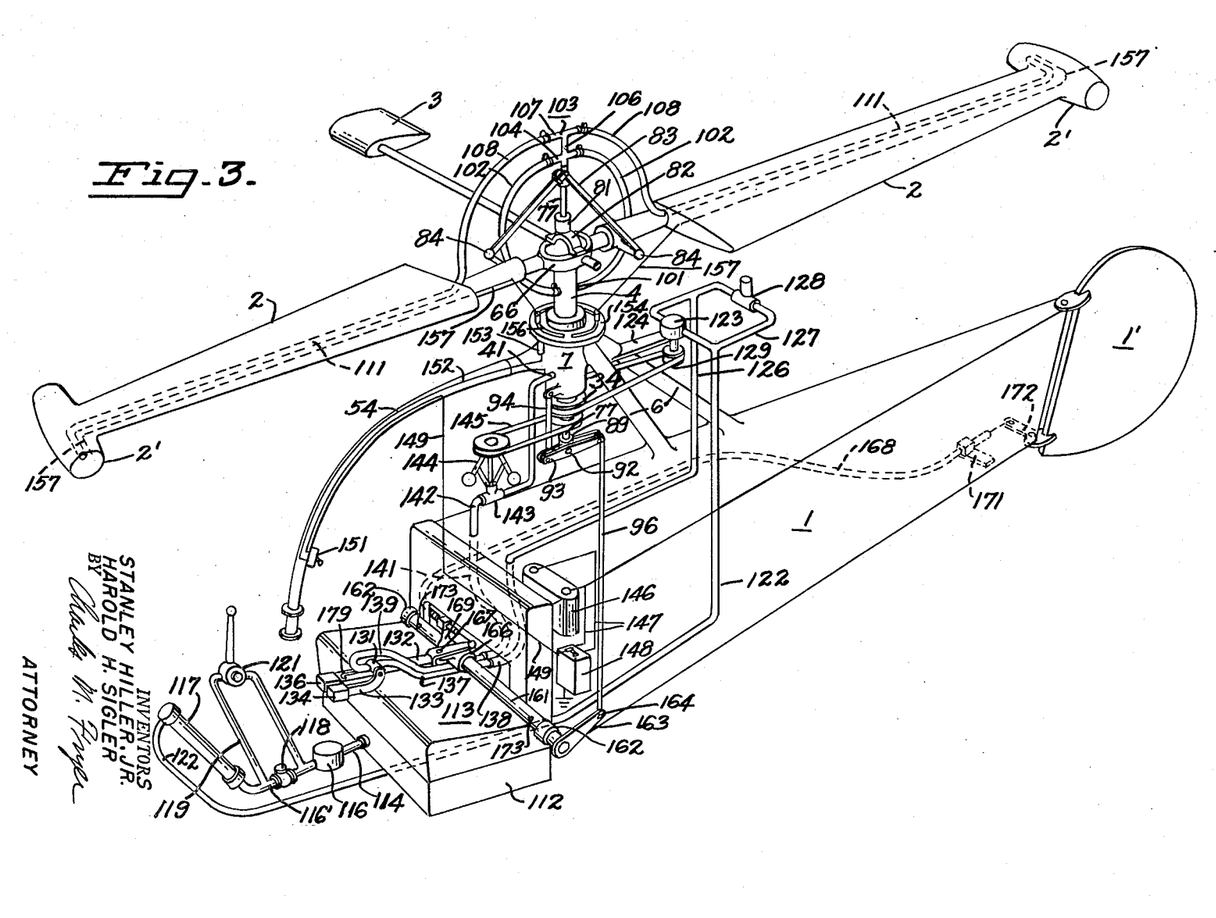
Fig. 3 is a schematic isometric view of portions of the helicopter illustrating the fuel distributing system, ignition system, and master control lever.

Means is provided for quickly and easily securing control lever 132 to shaft 161 in any one of a plurality of positions to which the control lever is adapted to be bodily adjusted. For this purpose, shaft 161 is formed with preferably three apertures 173, one adjacent each end of the shaft, and a third slightly to the right of the middle of the shaft in the position shown in Fig. 3. The body of control lever 132 is tubular; and its head 136 is slidably mounted in the outer end of such tube, and has secured thereto a latching rod or pin 174 which extends through the tubular body and is adapted to engage in any one of latching apertures 173, to thus secure the lever to the shaft. Although three latching apertures 173 are preferred in the positions indicated, any other desired member may be provided.

Latching rod 174 is spring thrust inwardly to hold the same in engagement in a selected aperture 173, by a compression coil spring 176 about rod 174 and interposed between an abutment element 177 on the rod and an abutment 178 in the tube of lever 132. A bayonet slot 179 is provided adjacent the outer end in the tube of lever 132; and a pin 181 on the head 136 engages in slot 179. When head 136 is pulled outwardly and turned to slide pin 181 into the leg 182 of slot 179 which extends transversely to the axis of the lever, head 136 and rod 174 will be held outwardly against the action of spring 176. Rod 174 is of such length as to be just out of engagement with the shaft when head 136 is held outwardly, to allow the control lever to be moved laterally to any desired latching position.

The inner end portion of rod 174 is piloted in a hole in the inner end of the tube of lever 132 to guide it properly to engage the selected aperture 173 when head 136 is released by the pilot, thus allowing spring 176 to thrust rod 174 inwardly. In this connection, the inner end of rod 174 is pointed to facilitate penetration of the rod into the selected aperture 173. So as not to interfere with the lateral adjustment of lever 132 about pivot 167 when it is detachably secured to shaft 161, the inner end portion of latching rod 174 is provided with a pivotal connection 183 to an outer portion of the rod. Connection 183 is such distance from the inner end of the rod, as to be located on the upright pivotal axis 167 when lever 132 and shaft 161 are connected by rod 174. Hence, lever 132 can be swung laterally without any interference.

We claim:

1. In a jet propelled rotary wing aircraft, a body, a tail rudder movably connected to said body, a rotor column mounted on said body, a rotor comprising lift wings supported by said column for rotation about the axis of said column, jet motors on said wings, means including control shafting movable along said column providing for collective pitch adjustment of said wings; means for supplying fuel to said motors including a fuel distributing member mounted on and movable with said control shafting, and flexible fuel lines connected to said distributing member; and pilot operable control means for the collective pitch adjustment of said wings and for moving said rudder comprising a control lever, means mounting said control lever on said body for back and forth movement in one direction to control said collective pitch control shafting and for back and forth movement in another direction to control said rudder, and actuating connections between said control lever and said control shafting and said rudder.

2. In a jet propelled rotary wing aircraft, a body, a tail rudder movably connected to said body, a rotor column mounted on said body, a rotor comprising lift wings supported by said column for rotation about the axis of said column, jet motors on said wings, means including control shafting extending through and movable along said column providing for collective pitch adjustment of said wings; means for supplying fuel to said motors including a fuel distributing member mounted on and movable with said control shafting, and flexible fuel lines connected to said distributing member; pilot operable control means for the collective pitch adjustment of said wings and for moving said rudder comprising a control lever, means mounting said control lever on said body for back and forth movement in one direction to control said collective pitching control shafting and for back and forth movement in another direction to control said rudder, and actuating connections between said control lever and said control shafting and said rudder; and means including a manually operable fuel control member mounted on said control lever for controlling the supply of fuel to said motors.

3. In a jet propelled rotary wing aircraft, a body, a tail rudder movably connected to said body, a rotor column, means for resiliently mounting said column on said body, a rotor comprising lift wings supported by said column for rotation about the axis of said column, jet motors on said wings, means including control shafting extending through and movable axially along said column providing for collective pitch adjustment of said wings; means for supplying fuel to said motors including a fuel distributing member mounted on and movable with said control shafting, a fuel passage in said column communicating with a fuel outlet port in the column, a flexible fuel line connected to said outlet port and to said distributing member, and flexible fuel lines connected to said distributing member and to fuel lines on said wings; and pilot operable control means for the collective pitch adjustment of said wings and for moving said rudder comprising a control lever, means mounting said control lever on said body for back and forth pivotal movement in one direction to control said collective pitch control shafting and for back and forth pivotal movement in another direction to control said rudder, and actuating connections between said control lever and said control shafting and said rudder.

4. In a jet propelled rotary wing aircraft, a rotor column, a rotor comprising lift wings supported by said column for rotation about the axis of said column, jet motors on said wings, means including control shafting movable along said column providing for collective pitch adjustment of said wings; and means for supplying fuel to said motors including a fuel distributing member mounted on and movable with said control shafting, a fuel passage in said column communicating with an outlet port in said column, a flexible fuel line connected to said port and to said distributing member, and flexible fuel lines connected to said distributing member and to fuel lines on said wings.

5. In a rotary wing aircraft, a body, mechanism to effect steering of the body, mechanism providing for collective pitch adjustment of the wings of the aircraft including movable control shafting; and pilot operable control means for said mechanisms comprising a shaft extending transversely with respect to and journalled on said body for turning movement about a horizontal axis, a control lever connected to the shaft for pivotal movement about an upright axis and by which the shaft can be turned, an actuating connection between the shaft and the collective pitch control shafting operable upon turning of the shaft by said control lever, and an actuating connection between said control lever and said steering mechanism operable upon pivoting of said lever about its pivotal connection with the shaft.

6. In a rotary wing aircraft, a body, mechanism to effect steering of the body, mechanism providing for collective pitch adjustment of the wings of the aircraft including movable control shafting; and pilot operable control means for said mechanisms comprising a shaft extending transversely with respect to and journalled on said body for turning movement about a horizontal axis, a sleeve slidably mounted on said shaft for lateral adjustment therealong, a control lever mounted on said sleeve for pivotal movement about an upright axis and by which the shaft can be turned, means for securing said sleeve to said shaft in a predetermined position, an actuating connection between the shaft and the collective pitch control shafting operable upon turning of the shaft by said control lever, and an actuating connection between said control lever and said steering mechanism operable upon pivoting of said lever about its pivotal connection on said sleeve.

7. In a rotary wing aircraft, a body, mechanism to effect steering of the body, mechanism providing for collective pitch adjustment of the wings of the aircraft including movable control shafting; pilot operable control means for said mechanisms comprising a shaft extending transversely with respect to and journalled on said body for turning movement about a horizontal axis, a sleeve slidably mounted on said shaft for lateral adjustment therealong, a control lever mounted on said sleeve for pivotal movement about an upright axis and by which the shaft can be turned, means for securing said sleeve to said shaft in a predetermined position including a manually operable rod slidably mounted on said control lever, an actuating connection between the shaft and the collective pitch control shafting operable upon turning of the shaft by said control lever, an actuating connection between said control lever and said steering mechanism operable upon pivoting of said lever about its pivotal connection on said sleeve; and means including a manually operable control member mounted on said control lever for controlling a fuel supply valve.

8. In a rotary wing aircraft, a body, a first mechanism on said body adapted to be pilot controlled, a second mechanism on said body adapted to be pilot controlled; and pilot operable control means for said mechanisms comprising a shaft extending transversely with respect to and journalled on said body for turning movement about a horizontal axis, a sleeve slidably mounted on said shaft for lateral adjustment therealong, a control lever mounted on said sleeve for pivotal movement, means for securing said sleeve to said shaft in a predetermined position including a manually operable member movably mounted on said control lever, an actuating connection between said shaft and said first mechanism operable upon turning of the shaft by the control lever, and an actuating connection between said control lever and said second mechanism operable upon pivoting of said lever about its pivotal connection on said sleeve.

9. In a rotary wing aircraft, a body, a first aircraft flight control mechanism on said body adapted to be pilot controlled, a second aircraft flight control mechanism on said body adapted to be pilot controlled; and pilot operable control means for said mechanisms comprising a shaft extending transversely with respect to and journalled on said body for turning movement about a horizontal axis, a sleeve slidably mounted on said shaft for lateral adjustment therealong, a control lever mounted on said sleeve for pivotal movement about an upright axis, means for securing said sleeve to said shaft in a predetermined position including a manually operable rod slidably mounted on said control lever, an actuating connection between said shaft and said first mechanism operable upon turning of the shaft by the control lever, an actuating connection between said control lever and said second mechanism operable upon pivoting of said lever about its pivotal connection on said sleeve, and means including a manually operable control member mounted on said control lever for controlling a third aircraft flight control mechanism, said manually operable control member being movably mounted adjacent the head of said control lever whereby said control member and said control lever can be manipulated by the pilot with one hand for control of all three of said flight control mechanisms by said one hand.

10. In a rotary wing aircraft, a hollow rotor column, a supporting sleeve structure for said column and into which the column extends, means rotatably mounting said column on said sleeve structure, a rotor comprising lift wings supported by said column, jet motors on said wings; and means for supplying fuel to said motors including a tube within and extending axially along said column, said tube being fixed for rotation with and spaced from the inner wall of said column to provide an annular rotatable fuel conducting passage, said column being apertured adjacent its lower end to provide a fuel inlet portion communicating with said annular fuel passage and also being apertured adjacent its upper end to provide a fuel outlet portion communicating with said annular fuel passage, means connected to the fuel inlet portion for conducting fuel into said annular passage, and fuel conducting means connected between said fuel outlet portion and the jet motors; and means including control shafting extending through said tube movable axially along said column providing for collective pitch adjustment of said wings.

11. The construction of claim 10 in which the rotor column is resiliently mounted in said supporting sleeve structure by means including a resilient sleeve about said column.

12. In a rotary wing aircraft, a rotatable rotor column, a fixed support sleeve for said column into which the column extends, a rubber sleeve bonded to inner and outer metal sleeves about said column between the column and said support sleeve providing a resilient mounting for said column, means fixedly holding said outer metal sleeve of said resilient mounting in said support sleeve; and means providing rotatable support for said rotor column including a stationary sleeve element adjacent the upper end of said inner metal sleeve of said resilient mounting and having a shoulder at its upper end supported by the upper face of said inner metal sleeve, said shoulder carrying journal means for said rotor column, and a nut element adjacent the lower end of said inner metal sleeve, one of said elements extending into said inner metal sleeve and said nut element having a screw threaded connection with said stationary sleeve element, said nut elment being in tightened relationship with the lower face of said inner metal sleeve; the support sleeve having annular clearance at each end thereof about said rotor column whereby the rotor column can rock freely on said resilient mounting.

References Cited in the file of this patent

UNITED STATES PATENTS

| | | |
|---|---|---|
| 1,506,716 | Pescara | Aug. 26, 1924 |
| 2,045,269 | Henderson | June 23, 1936 |
| 2,068,617 | Wilford | Jan. 19, 1937 |
| 2,206,474 | Bowers | July 2, 1940 |
| 2,221,884 | Schmidt | Nov. 19, 1940 |
| 2,318,260 | Sikorsky | May 4, 1943 |
| 2,321,575 | Campbell | June 15, 1943 |
| 2,395,143 | Prewitt | Feb. 19, 1946 |
| 2,437,324 | Kirchoff | Mar. 9, 1948 |
| 2,472,917 | Nicolaeff | June 14, 1949 |
| 2,485,502 | McCollum | Oct. 18, 1949 |
| 2,534,353 | Hiller et al. | Dec. 19, 1950 |
| 2,534,738 | Scott | Dec. 19, 1950 |
| 2,585,468 | Isacco | Feb. 12, 1952 |
| 2,633,925 | Bates | Apr. 7, 1953 |
| 2,689,011 | Zakhartchenko | Sept. 14, 1954 |